United States Patent [19]

Mayland

[11] 4,081,517

[45] Mar. 28, 1978

[54] NITROGEN OXIDE CONVERSION PROCESS

[75] Inventor: Bertrand J. Mayland, Louisville, Ky.

[73] Assignee: Chenoweth Development Laboratories, Inc., Louisville, Ky.

[21] Appl. No.: 748,903

[22] Filed: Dec. 9, 1976

Related U.S. Application Data

[63] Continuation of Ser. No. 557,914, Mar. 13, 1975, abandoned.

[51] Int. Cl.$^2$ .............................................. C01B 21/40
[52] U.S. Cl. .................................... 423/393; 423/402
[58] Field of Search ................ 423/392, 393, 400, 402

[56] References Cited

U.S. PATENT DOCUMENTS

| | | | |
|---|---|---|---|
| 1,391,332 | 9/1921 | Mc Kee | 423/402 |
| 1,991,452 | 2/1935 | Fauser | 423/392 |
| 2,088,057 | 7/1937 | Handforth | 423/393 |
| 2,135,733 | 11/1938 | Richardson | 423/392 |
| 2,212,135 | 8/1940 | Titlestad et al. | 423/392 |
| 3,542,510 | 11/1970 | Newman et al. | 423/393 |

FOREIGN PATENT DOCUMENTS

| | | | |
|---|---|---|---|
| 807,885 | 1/1959 | United Kingdom | 423/392 |

*Primary Examiner*—G. O. Peters
*Attorney, Agent, or Firm*—Harry B. O'Donnell, III

[57] ABSTRACT

The present invention provides a novel process for treating a fluid stream carrying various components including nitrogen oxides, wherein the stream is subjected to oxidative reactions under gaseous and absorptive conditions to convert a portion of the nitrogen oxides to nitric acid and thereby simultaneously reduce the concentration of nitrogen oxides in the stream discharge. Basically, the novel process provided by the present invention for efficiently removing nitrogen oxides from a selected fluid stream and converting them to nitric acid, without the use of additional chemical elements, includes steps of: (a) further oxidizing a portion of the nitrogen oxides carried in the fluid stream; (b) removing liquid and gaseous effluents from the oxidizing means; (c) scrubbing the gaseous effluent removed from the oxidizing means with an aqueous solution of nitric acid; (d) separating the liquid and gaseous components of the stream removed from the scrubbing means; (e) bleaching the oxidizing and scrubbing liquid streams in contact with a countercurrent flow of gas; (f) passing the gas stream emitted from the bleaching means to the oxidizing means; and (g) withdrawing product nitric acid from the bleaching means.

The process provided by the present invention can further provide a step of recycling a portion of the liquid effluent from the bleaching means to the scrubbing means to increase the concentration of nitric acid and can further include a catalytic oxidization process step wherein a silica gel and sodium silicate catalyst is used.

8 Claims, 2 Drawing Figures

NITROGEN OXIDE CONVERSION PROCESS

This is a continuation of application Ser. No. 557,914, filed Mar. 13, 1975, now abandoned.

BACKGROUND OF THE INVENTION

This invention relates to a process for producing nitric acid and, more particularly, to a process for treating a fluid stream carrying various components including nitrogen oxides, wherein the stream is subjected to oxidative reactions under gaseous and absorptive conditions to convert a portion of the nitrogen oxides to nitric acid and thereby simultaneously reduce the concentration of nitrogen oxides in the stream discharge.

Prior processes and apparatus have been provided for the production of nitric acid, as, for example, from a fluid stream produced in an ammonia combustion process.

In the conventional prior process, as shown in U.S. Pat. No. 2,134,733, RICHARDSON, an oxidation step and an absorption step are utilized to produce nitric acid from the off gas through an ammonia oxidation step wherein the fluid emitted from the ammonia oxidation step is passed through a separator and where the off gas from the oxidation step passes through the absorber. Liquid product nitric acid is removed from both the oxidizer means and the absorber. Liquid product nitric acid is removed from both the oxidizer means and the absorber means and the two product streams are mixed.

Another previous arrangement, as shown in U.S. Pat. No. 3,339,965, KALOUS, has provided multi-stage steps for the oxidation and separation of nitrogen oxides for the production of nitric acid from a fluid stream, for example, wherein the off gas of the fluid stream from an ammonia oxidization process and wherein the product from the ammonia oxidization step is separated and then dilivered to two different combined absorption and oxidization reaction means.

In another prior arrangement, as shown in U.S. Pat. No. 3,591,342, LEROLLE, the fluid stream emitted from an ammonia burner is first passed through a separator to separate its liquid and gas phases, while the liquid therefrom is passed immediately to the absorber, and no separator liquid is supplied to the oxidizer means. In the process taught by Lerolle, the product from the ammonia oxidization stream is supplied directly to the absorber and none of the liquid product from the ammonia oxidization process is applied initially to the oxidizer.

SUMMARY OF THE INVENTION

The present invention provides a novel process for treating a fluid stream carrying various components including nitrogen oxides, wherein the stream is subjected to oxidative reactions under gaseous and absorptive conditions to convert a portion of the nitrogen oxides to nitric acid and thereby simultaneously reduce the concentration of nitrogen oxides in the stream discharge. Basically, the novel process provided by the present invention for efficiently removing nitrogen oxides from a selected fluid stream and converting them to nitric acid, without the use of additional chemical elements, includes steps of: (a) further oxidizing a portion of the nitrogen oxides carried in the fluid stream; (b) removing liquid and gaseous effluents from the oxidizing means; (c) scrubbing the gaseous effluent removed from the oxidizing means with an aqueous solution of nitric acid; (d) separating the liquid and gaseous components of the stream removed from the scrubbing means; (e) bleaching the oxidizing and scrubbing liquid streams in contact with a countercurrent flow of gas; (f) passing the gas stream emitted from the bleaching means to the oxidizing means; and (g) withdrawing product nitric acid from the bleaching means.

The process provided by the present invention can further provide a step of recycling a portion of the liquid effluent from the bleaching means to the scrubbing means to increase the concentration of nitric acid and can further include a catalytic oxidization process step wherein a silica gel and sodium silicate catalyst is used.

The present invention is applicable to any fluid stream containing nitrogen oxides and, theoretically, it is possible by the present invention to obtain nearly 100 percent recovery of nitrogen oxides as nitric acid product, to reduce the concentration of nitrogen oxides in the effluent gas to less than 50 parts per million, and to produce nitric acid with maximum theoretical concentration of around 73 percent in the case of a gas derived from ammonia oxidation.

The present invention further provides a catalyst to promote the oxidation of nitrogen oxide to nitric acid.

Various other features of the present invention will become obvious to those skilled in the art upon reading the disclosure set forth hereinafter.

BRIEF DESCRIPTION OF THE DRAWING

The present invention is illustrated in the accompanying drawing, which illustrates examples of presently preferred forms of the novel process of the present invention, wherein.

DETAILED DESCRIPTION

Figure 1:
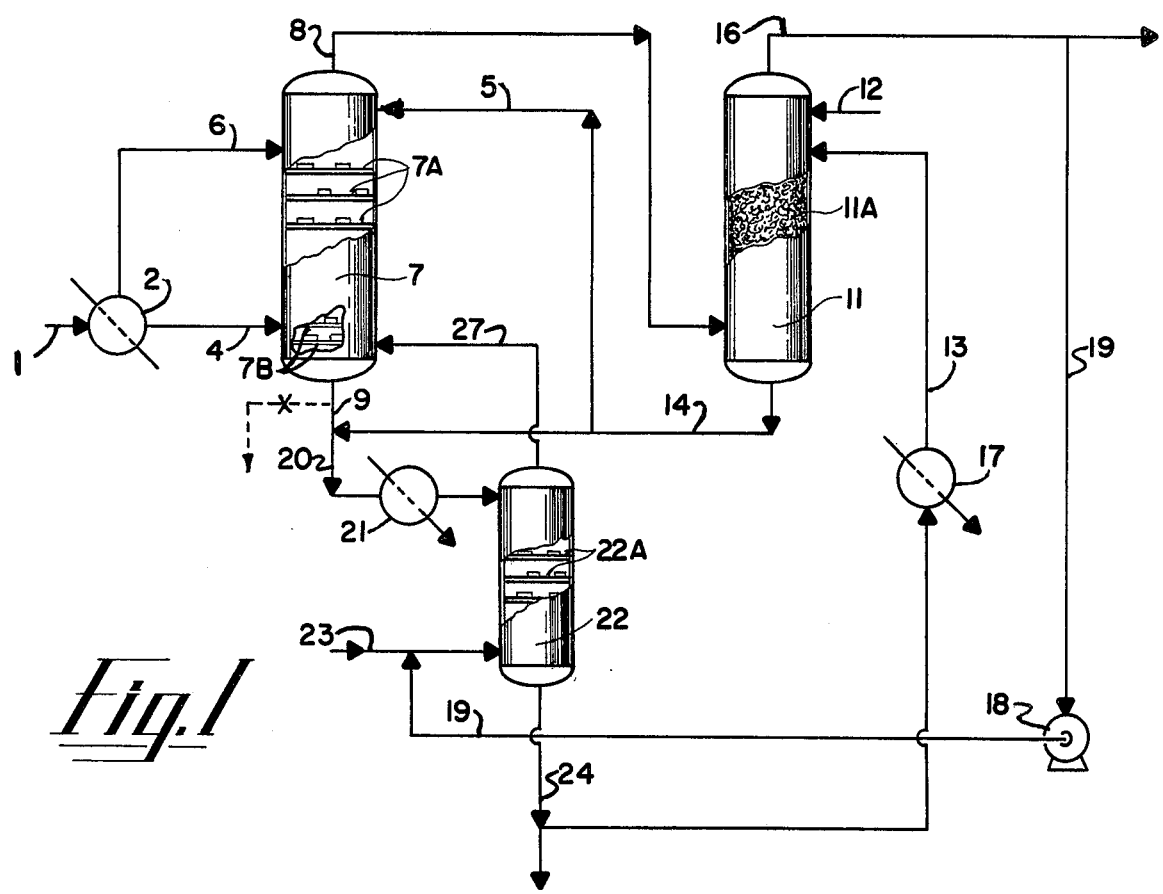
FIG. 1 is a schematic view of an arrangement in accordance with the present invention utilizing a non-catalytic oxidative reaction.

The present invention recognizes the advantages of the equilibrium and reaction and absorption mechanisms involved in the formation of nitric acid and provides significant improvements as a result thereof.

The present invention further recognizes that another oxidation reaction for the formation of nitric acid occurs at the interface between the liquid and gas phases and can be generally represented by the reaction:

$$\tfrac{1}{2} O_2 + HNO_2 \rightarrow HNO_3, \qquad \text{I.}$$

where the reaction can be catalyzed or uncatalyzed.

It is further recognized that the production of nitric acid from nitrogen oxide can proceed by physical absorption as well as chemical oxidation absorption reactions. In physical absorption reactions $NO_2$ and $NO$ react as:

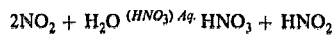

$$2NO_2 + H_2O \xrightarrow{(HNO_3)\ Aq.} HNO_3 + HNO_2 \qquad \text{II.}$$

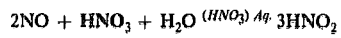

$$2NO + HNO_3 + H_2O \xrightarrow{(HNO_3)\ Aq.} 3HNO_2 \qquad \text{III.}$$

In physical absorption, the dissolved nitrogen oxide reacts with water and nitric acid to form $HNO_2$ with loss of nitric acid. Nitrogen dioxide forms equal amounts of nitric acid and nitrous acid. In both of these reactions, there is no net increase in the state of oxidation of the overall system since there is no oxidation. The reactions are driven to the right by increased partial pressure of nitrogen oxides and reversed by lowering the partial pressure of the nitrogen oxides in the gas phase. The system is also shifted to the right by lower temperature and to the left by higher temperature.

It is further recognized that this generally exists only in aqueous solution and $HNO_2$ decomposes according to the reaction:

$$2HNO_2 \; NO + NO_2 + H_2O. \qquad \text{IV.}$$

The present invention also recognizes that the oxidation of $HNO_2$ according to the Reaction I. is promoted to providing an extended surface in the oxidation step and that, by separating the liquid and gaseous effluent from the oxidation step, the off gas from the oxidation step will include principally nitrogen oxide which is oxidized in the gas phase and nitrogen peroxide.

The present invention further recognizes that chemical oxidation absorption reactions can be utilized to effectively reduce the nitrogen oxides in effluent gases.

However, such reactions are slow and prior processes have in many cases required uneconomically large absorbers to permit the reactions to proceed to completion. Accordingly, it has heretofore in many cases, been uneconomical to provide systems to achieve nitrogen oxide levels sufficient to meet pollution standards.

In addition, the present invention recognizes that certain oxidative absorption reactions also occur where nitrogen oxides can be converted to nitric acid in aqueous solution in the presence of oxygen.

Oxidative absorption reactions can be represented as:

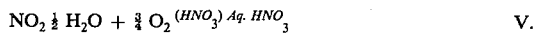

$$NO_2 \; \tfrac{1}{2} H_2O + \tfrac{1}{4} O_2 \; ^{(HNO_3) \, Aq.\, HNO_3} \qquad \text{V.}$$

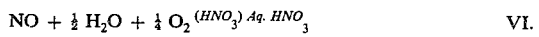

$$NO + \tfrac{1}{2} H_2O + \tfrac{3}{4} O_2 \; ^{(HNO_3) \, Aq.\, HNO_3} \qquad \text{VI.}$$

It will be recognized that the present invention utilizes both absorption reactions and oxidative absorption reactions and that the methods and sequences provided by the invention provide means for advantageous utilization of both types of reactions.

NON-CATALYTIC OXIDATIVE ABSORPTIVE REACTION:

Referring now to FIG. 1, which shows a process in accordance with the present invention, utilizing an uncatalyzed system for oxidative absorptive and absorptive reaction for the oxides of nitrogen, a feed stream 1, that can be a fluid including liquid and gas phases when the liquid phase includes an aqueous solution of mixed oxides of nitrogen including mixed oxides of nitrogen, nitric acid, and water, as, for example, from an ammonia oxidation process, is passed through a condenser 2 where the liquid and gas phases are separated.

An oxidizer column 7, that can, for example, include spaced sieve plates 7A or can be a column packed with, for example, Raschig Rings, is provided to permit countercurrent gas-liquid contact, as described hereinafter.

The gas stream 4 that is separated from the feed stream 1 by the condenser 2 is admitted near the bottom of the oxidizer column 7 to flow upwardly through the openings of the plates 7A contained therein countercurrent flow to a liquid stream 5, which is recovered from a scrubber column 11 and supplied to the top of the oxidizer column 7 to flow downwardly through the plates 7A contained therein in a countercurrent relation with the gas flowing through the oxidizer column 7. The liquid stream 6, that is separated from the feed stream 1 by the condenser 2 is added to the oxidizer column 7 at a point located between the plates 7A contained therein and the inlet thereto of the aforedescribed liquid stream 5 that is recovered from scrubber column 11.

In addition to the aforenoted gas stream 4, the oxidizer column 7 is also supplied with a second gas stream 27, including oxygen and mixed oxides of nitrogen, as hereinafter described, to provide oxygen for reaction, and to recycle oxides of nitrogen for conversion to nitric acid. As illustrated, this second gas stream 27 is emitted from the top of a bleacher 22, which will be described in detail hereinafter, and is admitted to the bottom of the oxidizer column 7 and bleaches the product acid contained in section 7B thereof, which comprises additional sieve plates or trays 7B that are located in the oxidizer column 7 between its bottom and the inlet of the first-mentioned gas stream 4.

Reactions I - VI take place in the oxidizer column 7, with the predominate reaction depending on the conditions within the oxidizer column 7, namely vapor pressure, temperature, mixing efficiency and interface contact efficiency. The important reaction in the oxidizer column 7 is that of nitrogen oxides with water and oxygen to form nitric acid and not physical absorption of nitrogen oxides. $HNO_2$ is formed in the liquid phase during the absorptive reactions II and III. A portion of the $HNO_2$ is decomposed in accordance with reaction IV, while the balance is emitted in the effluent stream 9 from the oxidizer column 7.

The effluent stream 9 is removed from the bottom of the oxidizer column 7 and includes concentrated nitric acid (in excess of 70% nitric acid). The $HNO_2$ concentration is, for example, less than 1%.

A gas stream 8 including mixed oxides of nitrogen, as well as oxygen and $HNO_3$ is withdrawn from the top of the oxidizer column 7 and supplied as primarily a gas feed to the scrubber column 11, which can include sieve plates or Raschig Rings 11A.

As in prior arrangements for production of nitric acid, a liquid reflux is supplied to the top of the oxidizer colum 7 to decrease the loss of nitrogen oxides. In prior arrangements, the liquid reflux was usually water which would reduce the concentration of acid in the liquid effluent stream 9 from the bottom of the oxidizer column 7. In accordance with one advantageous feature of the present invention, part of the liquid effluent 14 from the bottom of the scrubber column 11 is introduced to the top of the oxidizer column 7 as the liquid stream 5, as previously described above, which acts as a reflux to promote the reaction of the nitrogen oxides and increase the concentration of nitric acid in the liquid effluent stream 9 from the oxidizer column 7.

As previously discussed above, both oxidative absorption and physical absorption reactions occur in the scrubber column 11. The absorptive medium for the reactions of nitrogen oxides to nitric acid is supplied to the scrubber column 11 from the bleacher column 22, as hereinafter described in detail below.

In accordance with another feature of the present invention, another liquid reflux stream 13, that is precooled in a heat exchanger 17, and water 12, are admitted at selected, and advantageously separate, locations into the scrubber column 11. Cooling this other liquid reflux stream 13, as just described, provides cooling to drive the absorptive reactions II and III toward completion to reduce NO and NO₂ concentrations in the scrubber column 11.

The water 12 supplied to the scrubber column 11 is helpful to reduce the concentration of nitric acid vapor emitted by its vent 16. However, it is recognized that the water 12 introduced to the scrubber column 11 lowers the concentration of HNO₃ in the effluent liquid stream 14 emitted from the bottom thereof. Accordingly, the present invention recognizes that introducing the water 12 reflux to the scrubber column 11 above the point of introduction of the acid reflux stream 13 reduces the quantity of the water 12 needed to lower the quantity of oxides carried over in the gas vent stream 16 therefrom but permits maximization of the concentration of nitric acid contained in the effluent liquid stream 14 emitted from the bottom thereof.

As shown in drawing FIG. 1, the liquid effluent stream 14 that is emitted from the bottom of the scrubber column 11 can be combined with the effluent liquid stream 9 which is emitted from the bottom of the oxidizer column 7 to provide an aqueous stream 20 including nitric acid, nitrous acid and nitrogen oxides. This aqueous stream 20 can be heated in a heat exchanger 21 and passed to the bleacher column 22, at a point above sieve trays 22A contained within it, to allow countercurrent contact within the bleacher column 22 of liquid from the aqueous stream 20 and gas from a gas stream 23, that preferably comprises air, which is supplied to the bottom of the bleacher column 22 to flow upwardly through it and the tray 22A.

The off gas stream 16 that is emitted from the top of the scrubber column 11 contains as little as 200 parts per million of nitrogen oxides, and a portion of the off gas stream 16, which is not vented, can be provided as a recycle gas stream 19 to the bleacher column 22, where the oxides of nitrogen are stripped from the aqueous HNO₃ received from the oxidizer 7 and scrubber 11 columns. This recycle gas stream 19 is compressed by a compressor 18 prior to mixing it with the air stream 23 for introduction into the bleacher column 22 at a point below the sieve trays 22A contained therein. The air stream 23 is provided to supply the oxygen required for the oxidative reactions and to provide the gas necessary for stripping nitrogen oxides from the nitric acid that is produced in the bleacher column 22.

The aqueous stream 20 that is admitted to the bleacher column 22 is preheated in a heat exchanger 29 to permit the decomposition of the nitrous acid, which is, for all practical purposes, the principal impurity contained therein, according to the reaction:

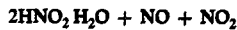

$$2HNO_2 \rightarrow H_2O + NO + NO_2$$

to convert the nitrous acid to nitrogen oxides for its removal therefrom.

Additionally, upon admission of the air stream 23 to the bleacher column 22 the liquid acid stream 20 contained therein is exposed to the combined air 23 and recycled gas 16 streams such as there can be some direct oxidation of the undecomposed nitrous acid to nitric acid at the liquid-gas interface therein. The required oxygen is provided by the air stream 23 and the recycle gas stream 19.

The bleached liquid effluent stream 24, which is removed from the bottom of the bleacher column 22, can contain product nitric acid in excess of 70% concentration.

And, as previously described above, a portion of the aqueous nitric acidcontaining effluent stream 24 from the bleacher column 22 can be recycled as the stream 13 to the scrubber column 11 to permit a decrease in the quantity of the water 12 required to be supplied as a reflux to the scrubber column 11 and thus increase the concentration of HNO₃ in the liquid effluent 14 from the bottom of the scrubber column 11.

Figure 2:
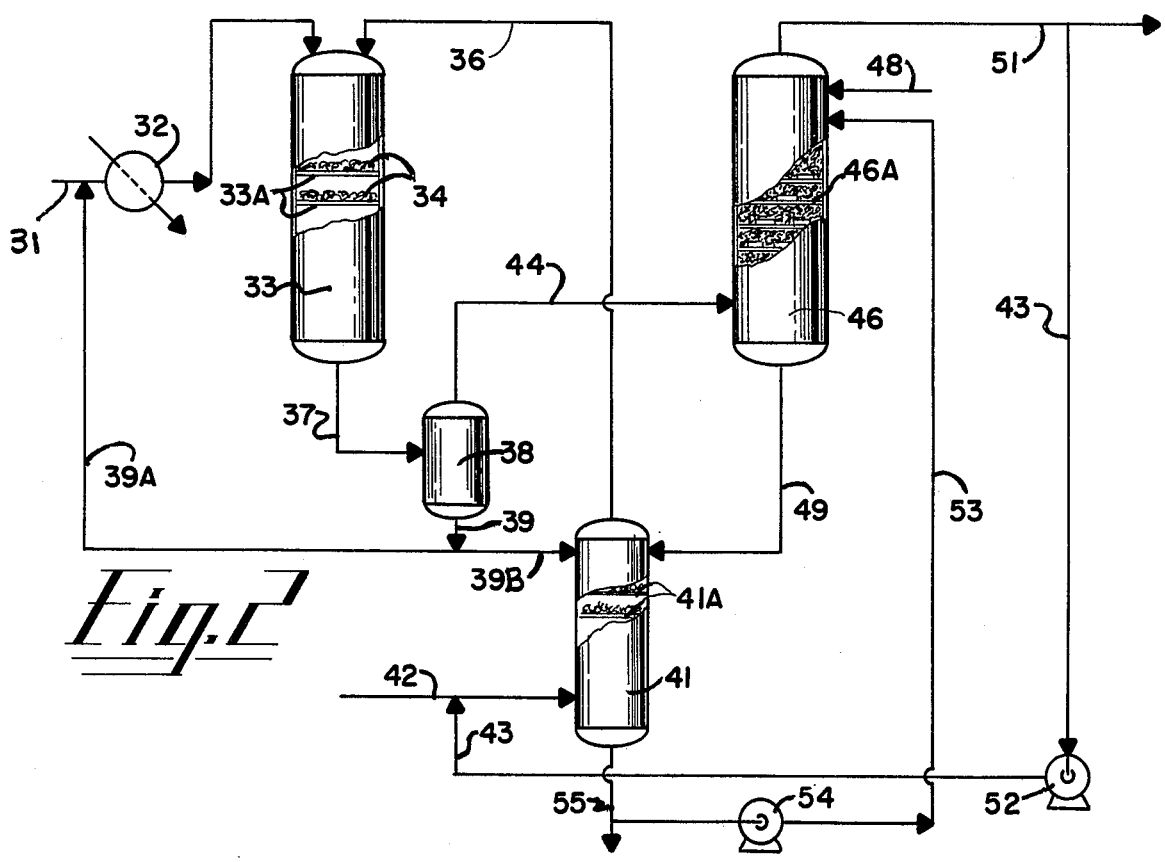
FIG. 2 is a schematic view of an arrangement in accordance with the present invention employing a catalytic oxidative reaction.

CATALYTIC OXIDATIVE ABSORPTIVE REACTION:

Referring now to FIG. 2, which illustrates a process in accordance with the present invention, employing an oxidation catalyst, as described hereinafter, a fluid stream 31 including mixed oxides of nitrogen, nitric acid, and water, as, for example, from an ammonia oxidation process, can be passed through a cooler 32 where a portion of the water contained therein is condensed.

The fluid stream 31 is passed to an oxidizer column 33 having spaced sieve plates 33A contained within it, and located downstream from an inlet provided thereto for the fluid stream 31 atop of each of which there is provided a selected catalyst 34, for example, a silica catalyst, as described in detail hereinafter.

A gas stream 36 containing oxides of nitrogen and oxygen is also supplied to the oxidizer column 33, wherein the catalyst 34, which is contained therein and located downstream from another inlet provided thereto for the gas stream 36, promotes the following oxidative reactions:

$$NO + \tfrac{1}{2} H_2O + \tfrac{3}{4} O_2 \rightarrow HNO_3 \qquad \text{I.}$$

$$NO_2 + \tfrac{1}{2} H_2O + \tfrac{1}{4} O_2 \rightarrow HNO_3 \qquad \text{II.}$$

An effluent liquid stream 37 including an aqueous solution of nitric acid, nitrous acid and nitrogen oxides is emitted from the bottom of the oxidizer column 33 into a liquid-gas separator 38. One portion 39A of the liquid 39 discharged from the separator 38 is recycled to the aforenoted fluid stream 31, while the other portion 39B is supplied to the top of a bleacher column 41, which contains perforated plates 41A such that the liquid 39B flows downwardly through the bleacher column 41 in a countercurrent relation with a combined air stream 42 and recycled gas stream 43 as described in detail hereinafter. A gas stream 44, which includes gaseous oxides of nitrogen and oxygen is emitted from the separator 38 and admitted to a scrubber column 46 which contains within it spaced apart sieve trays 46A, atop of each of which there can be provided additional amounts of the catalyst 34, or packing, such as Raschig Rings.

Further oxidization of the nitrogen oxides is continued in the scrubber column 46 by utilizing oxygen carried over thereto by the gas stream 44 supplied to the bottom thereof from the separator 38, and a water stream 48 can be supplied to the top of the scrubber column 46 to react with NO₂ to promote the production of nitric acid therein.

The liquid effluent 49 that is emitted from the bottom of the scrubber column 46 is admitted to the top of the bleacher column 41. And, an off gas stream 51 is emitted from the top of the scrubber column 46, and a portion of that stream 51 which, in the process illustrated in drawing FIG. 2, contains as little as 200 parts per million of nitrogen oxides, can be provided as a recycled gas stream 43 to the bleacher column 41. This recycled gas stream 43 is compressed by a compressor 52 prior to mixing it with the air stream 42 for introduction into the bleacher column 41 at a point below the perforated trays 41A contained therein. The air stream 42 is provided to supply the oxygen required for the oxidative reactions and to provide the gas necessary for stripping nitrogen oxides from the product acid.

The nitrous acid formed in the scrubber column 46 is received in the bleacher 41 and combined therein with the portion 39B of the liquid also supplied thereto from the separator 38, which includes nitrous and nitric acid. In the bleacher column 41, as in the aforedescribed bleacher column 22, the nitrous acid is decomposed according to the reaction:

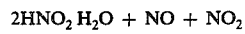

and the gas stream 36 containing unreacted nitrogen oxides and oxygen is supplied to the oxidizer column 33 as hereinabove described.

The bleached liquid effluent stream 55, which is removed from the bottom of the bleacher column 41, can contain product nitric acid in excess of 70% concentration.

And, as previously described above, a portion of the aqueous nitric acidcontaining effluent stream 55 from the bleacher column 41 can be recycled, by means of a pump 54, to provide reflux to the scrubber column 46 and, thus, reduce the amount of water 48 supplied to the scrubber column 46 and increase the concentration of nitric acid in the effluent stream 49 that is emitted therefrom and admitted to the bleacher column 41.

CATALYST

The present invention, as previously described, can include an oxidation catalyst to promote conversion of oxides of nitrogen to form nitric acid.

The catalyst provided by the present invention includes silica gel, sodium silicate and a binder material, for example, clay.

The catalyst can be formed according to the following procedure:

a. mixing from 18 to 25 pounds Eagle Chemical (TN) 28 × 200 mesh silica gel with from 1 to 5 pounds of Sodium Silicate and from 1 to 3 pounds of Old Hickory (TN) ball clay and from 0.5 to 2.5 pounds of Bentonite;

b. dry mixing the ingredients and adding from 4 to 8 pounds of water;

c. adding from 0.5 to 1.5 pounds of aluminum stearate and mixing to form a paste;

d. forming the mixture into a selected shape objects for example $\frac{3}{8} - \frac{1}{2}$ rings e. calcining the rings at from 400° F to 800° F; and f. impregnating the rings with sodium silicate or silica.

Within the scope of the present invention, the rings can be impregnated by dipping into an aqueous (30-60%) sodium silicate solution and dried at 300° to 400° F or can be dipped into a collidal silica composition and dried at 300° to 400° F.

The catalyst so formed has been found to exhibit excellent ability to promote the oxidation of nitrogen oxide bearing material and to enhance the production of nitric acid in the processes provided by the present invention.

It will be recognized that the foregoing are but a few examples of processes within the scope of the present invention and that various modifications, within the scope of the present invention will occur to those skilled in the art upon reading the disclosure hereinbefore.

What is claimed is:

1. A process for producing concentrated nitric acid from nitrogen oxides carried by a fluid stream, including the steps of:

(a) passing a fluid stream containing nitrogen oxides and water to oxidizer means;

(b) supplying a stream of gas including oxygen to said oxidizer means to be contacted by both nitrogen oxides and water which are contained in said fluid stream to react a portion thereof to aqueous nitric acid;

(c) removing liquid effluent containing nitrogen oxides and said aqueous nitric acid from said oxidizer means;

(d) passing said liquid effluent from said oxidizer means to bleaching means;

(e) passing an off gas stream from said oxidizer means to scrubbing means;

(f) passing liquid effluent from said scrubbing means, to said bleaching means;

(g) supplying an aqueous solution including nitric acid to said scrubbing means to contact said off gas stream passed to said scrubbing means;

(h) passing a gaseous stream that is first mixed with an off gas stream emitted from said scrubbing means through said bleaching means in countercurrent contact with said liquid effluents received from said oxidizer means and said scrubbing means for stripping of nitrogen oxides from said liquid effluents;

(i) passing an off gas stream emitted from said bleaching means and containing nitrogen oxides stripped therein to said oxidizer means to be contacted with said fluid stream; and (j) removing effluent containing an aqueous solution of concentrated nitric acid from said bleaching means.

2. The invention of claim 1 wherein said gaseous stream comprises an air stream.

3. The invention of claim 2, wherein a portion of the liquid emitted from said bleaching means is recycled to said scrubbing means.

4. The invention of claim 1, wherein a portion of the liquid emitted from said bleaching means is recycled to said scrubbing means.

5. The invention of claim 1, wherein the effluent from said oxidizer means is received in liquid-gas separator means and wherein liquid from said separator means is supplied to said bleaching means and gas emitted from said separator means is supplied to said scrubbing means.

6. The invention of claim 1, wherein the said oxidizer means is supplied with a catalyst comprising sodium silicate and silica gel that is located therein downstream from inlets respectively provided thereto for said fluid stream and said stream of gas to promote reaction of nitrogen oxides and water which are contained in said fluid stream and oxygen which is contained in said stream of gas to nitric acid.

7. The invention of claim 6, wherein said catalyst is a composition comprising: from about 50% to about 90% silica gel; from about 5% to about 15% sodium silicate; and from about 5% to about 20% of calcinable binder material.

8. The invention of claim 6, wherein said catalyst is a composition consisting essentially of: from about 50% to about 90% silica gel; from about 5% to about 15% sodium silicate; and from about 5% to about 20% of calcinable binder material.

* * * * *